United States Patent
Holdenried et al.

[11] 3,913,695
[45] Oct. 21, 1975

[54] FLUID-ACTUATED DRIVE SYSTEM FOR AUTOMOTIVE VEHICLE

[75] Inventors: Willy Holdenried, Immenstaad; Karlmann Hamma, Tettnang, both of Germany

[73] Assignee: Zahnradfabrik Friedrichshafen AG, Friedrichshafen, Germany

[22] Filed: Jan. 15, 1975

[21] Appl. No.: 541,106

[52] U.S. Cl. ................ 180/6.48; 60/428; 74/471 R
[51] Int. Cl.² ...................................... B62D 11/04
[58] Field of Search .......... 180/6.48, 6.3; 74/471 R, 74/479, 110; 60/428

[56] References Cited
UNITED STATES PATENTS

| | | | |
|---|---|---|---|
| 3,362,493 | 1/1968 | Davis et al. | 180/6.48 X |
| 3,461,669 | 8/1969 | Kanengieter | 180/6.48 X |
| 3,550,708 | 12/1970 | Paramythioti | 180/6.48 |
| 3,604,284 | 9/1971 | Houk | 180/6.48 |

*Primary Examiner*—Kenneth H. Betts
*Assistant Examiner*—John A. Pekar
*Attorney, Agent, or Firm*—Karl F. Ross; Herbert Dubno

[57] ABSTRACT

A pair of separately adjustable hydrostatic power trains for the driving of two traction elements of a vehicle are controlled by two levers having fulcrums on opposite sides of a slider and free ends in contact with two elongate guide tracks pivotable about fixed axes. A steering member fulcrumed in the common axial plane of these guide tracks has a neutral position in which two symmetrical camming surfaces thereof bear upon extensions of the cam tracks which are independently biased into normal positions parallel to the direction of slider motion. In these normal positions, a movement of the slider in one or the other direction displaces the two linkages symmetrically to drive the vehicle forward or backward. A swing of the steering member in one sense rotates one of the guide tracks into an off-normal position while leaving the other one unaffected; such a rotation has no effect in the midposition of the slider in which the hydrostatic units have zero output, the track-engaging end of the lever then lying in the axial plane, but results in a reduction and eventual reversal of the output of the corresponding hydrostatic unit in any other slider position.

8 Claims, 3 Drawing Figures

FLUID-ACTUATED DRIVE SYSTEM FOR AUTOMOTIVE VEHICLE

FIELD OF THE INVENTION

Our present invention relates to a system for maneuvering an automatic vehicle, e.g. an endless-track tractor, equipped with two traction elements on opposite sides thereof, these traction elements being rotatable at identical or different speeds in order to drive the vehicle forward and backward as well as to steer it.

BACKGROUND OF THE INVENTION

For a continuous variation of the absolute or relative speeds of two driven traction elements, which could be either wheels or endless tracks, it is already known to provide two fluidic transmissions such as hydrostatic pump-and-motor units. Thus, as described in commonly owned German printed specifications No. 1,929,380, two hydrostatic motors can be fed by a pair of individually adjustable pumps or a single pump may feed two individually adjustable motors. The pump or pumps can be driven from the vehicle engine so that their delivery rate is proportional to engine speed.

For steering purposes it is necessary to vary the relative motor speeds of these fluidic transmissions in a controlled manner. Conventional control mechanisms designed for this purpose, however, do not provide positive guidance for straight forward or backward driving so that, in practice, the operator must alternately veer in opposite directions in order to maintain a desired course.

OBJECTS OF THE INVENTION

An object of our present invention, therefore, is to provide an improved control mechanism for the fluidic transmissions of such a system facilitating straight driving and allowing the vehicle to be steered in a road-hugging manner comparable to that of vehicle with dirigible wheels.

Another object is to provide means in such a system for enabling the preselection of a desired radius of curvature for the vehicular path, e.g. upon entering into a curve, which remains substantially invariable despite changes in driving speed.

SUMMARY OF THE INVENTION

We realize these objects, in conformity with out present invention, by the provision of a slider which is displaceable between two limiting positions on opposite sides of a neutral position, two levers being symmetrically fulcrumed on the slider at locations flanking its centerline parallel to the direction of displacement. The levers are linked with respective adjustment means for varying the ratios of output speed to input speed of two reversible fluidic transmissions which are drivingly coupled, as discussed above, with the traction elements of the vehicle. Two guide elements, forming a pair of elongate tracks, are rotatable about fixed parallel axes which symmetrically flank the centerline of the slider and lie in a median plane perpendicular thereto; these guide elements are biased into a normal position in which their tracks are parallel to the centerline. The aforementioned levers have free ends respectively engaging the two guide elements at intermediate points of their tracks in the normal position thereof as long as the slider is in its neutral position. Upon selective rotation of either guide element by a common control member into an off-normal position in which its track includes an acute angle with the centerline of the slider, the point of engagement of the track with the associated lever is moved toward one or the other end of that track upon a shifting of the slider in one or the other direction from its neutral position. Such a shifting, therefore, establishes in the corresponding fluidic transmission a speed ratio of one or the other sign within a range of such speed ratios extending from a positive maximum through zero to a negative maximum. In a preferred instance, both transmissions have zero output in a midposition of the slider in which the free lever ends lie in the median plane containing the pivotal axes of the guide elements.

The control member is advantageously swingable about a pivot in the median plane and provided with two camming surfaces, the guide elements having extensions respectively bearing upon these camming surfaces in a centered position of the control member in which both guide elements are maintained in their normal position by their biasing means. Upon a swing of a control member in one or the other direction from its centered position, only one of the cam-following extensions is entrained to rotate the corresponding guide element into an off-normal position in which its track no longer parallels the centerline of the slider. The biasing means may comprise a pair of coaxial pistons with axially separated heads which are spring-urged against respective abutments, each piston being lined with a respective guide element.

BRIEF DESCRIPTION OF THE DRAWING

The above and other features of our invention will now be described in detail with reference to the accompanying drawing in which.

SPECIFIC DESCRIPTION

Figure 1:
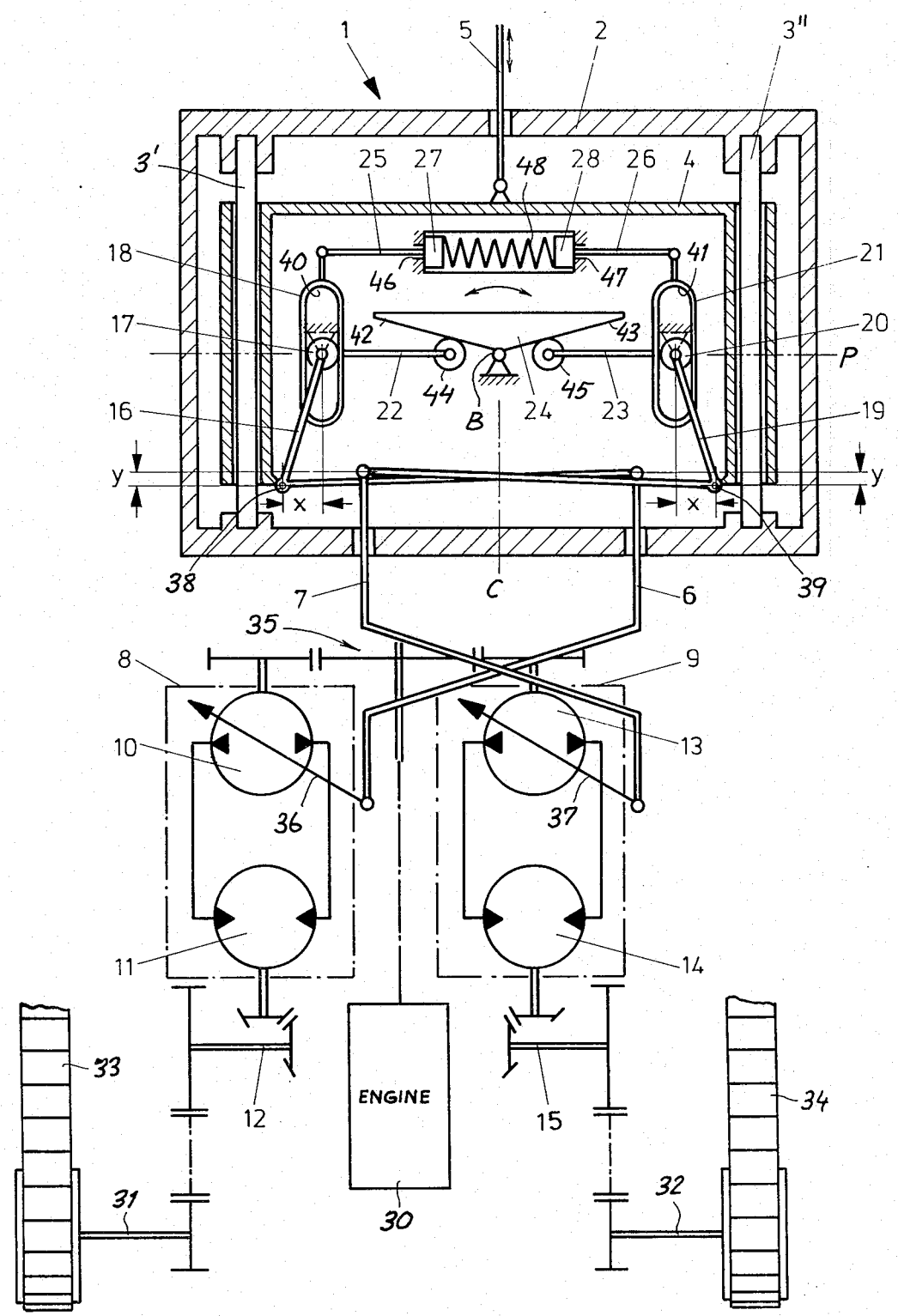
FIG. 1 is a somewhat diagrammatic view of a driving and steering mechanism for an endless-track-track vehicle embodying our invention.

In FIG. 1 we have diagrammatically indicated certain conventional parts of a utility vehicle, including an engine 30 and a pair of driven shafts 31, 32 for the transmission of torque from the engine to two traction elements in the form of endless tracks 33, 34 located on opposite sides of the vehicle. The power train from the engine 30 to the shaft 31, 32 includes gearing 35 and two fluidic transmissions 8 and 9 each comprising a pump 10, 13 feeding a hydrostatic motor 11, 14. Motors 11 and 14 have output shafts 12 and 15 respectively coupled with driven shafts 31 and 32.

The pumps 10 and 13 of the two hydrostatic units 8 and 9 are provided with arms 36, 37 pivotally mounted thereon for reversibly adjusting their delivery rates; in the position illustrated in FIG. 1, these delivery rates and therefore the speeds of output shafts 12 and 15 are zero. Arms 36 and 37 are articulated via respective links 6 and 9 to a first bell-crank lever 16 and a second bell-crank lever 19 respectively fulcrumed on a slider 4 at points 38, 39 symmetrically positioned with reference to a centerline C. Slider 4, forming part of a driving and steering mechanism 1, is shiftable in the direction of centerline C. along rails 3′, 3″ in a housing 2. The shift is manually controlled by the operator of the vehicle through the intermediary of a rod 5.

Figure 2:
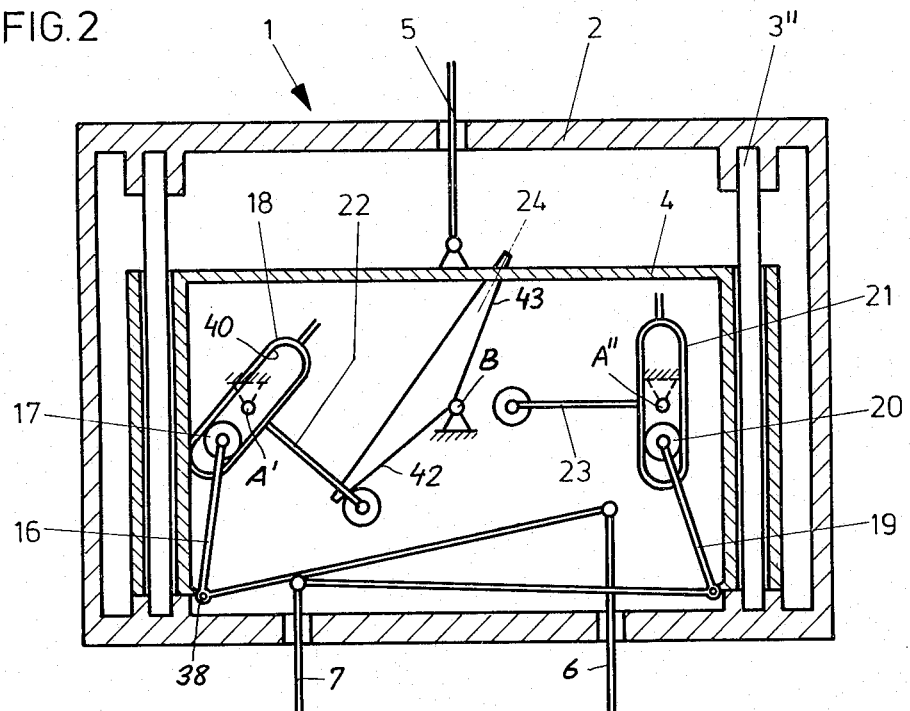
FIGS. 2 and 3 are two views of part of the mechanism of FIG. 1 in different steering and driving positions.
Figure 3:
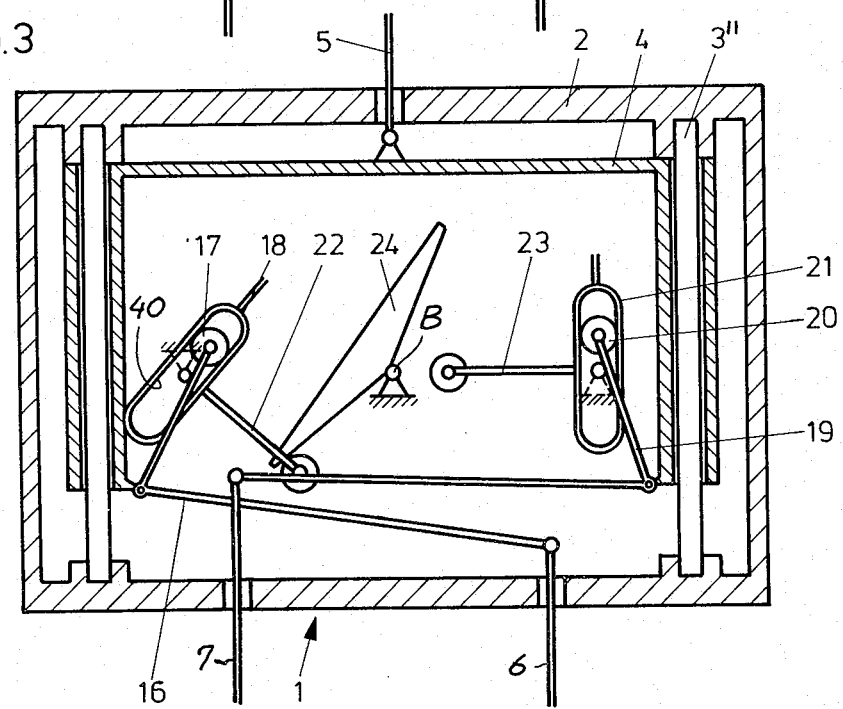

The free ends of lever 16 and 19 carry rollers 17 and 20 engaging in a pair of slots 40, 41 of two guide elements 18 and 21 which are independently swingable about fixed pivotal axes A', A'', These axes lying in a transverse plane P also containing the pivot B of a control member 24 which is provided with two camming surfaces 42, 43. Guide elements 18 and 21 have extensions 22 and 23 carrying cam-follower rollers 44, 45 which in the position of FIG. 1 bear upon the surfaces 42 and 43, respectively. In that position, two pistons 25 and 26 articulated to guide elements 18 and 21 have their heads 27 and 28 pressed against stationary abutments 46 and 47 by a common coil spring 48 interposed therebetween. These abutments, which may be adjustable for calibration purposes, thus determine two normal positions for the guide elements in which their tracks 40 and 41 lie parallel to centerline C. Any displacement of slider 4 parallel to that centerline, therefore, will bring about only a linear motion of rollers 17 and 20 without altering the angular positions of the corresponding levers 16 and 19. A downward shift of slider 4, as shown in FIG. 2, will then cause both arms 36 and 37 to be codirectionally adjusted to the same extent so that the pumps 10 and 13 will drive the motors 11 and 14 at a progressively increasing speed in what will be considered the forward direction. Conversely, an upward shift of the slider from the neutral position of FIG. 1, as shown in FIG. 3, will reverse the pump output so that motors 11 and 14 are accelerated in the opposite sense for driving in the rearward direction. During these operations, therefore, the transverse offset $x$ of the free ends of levers 16 and 19 (i.e. of the axes of rollers 17 and 20) from the corresponding fulcrums 38 and 39 will remain constant.

Let us now assume that the operator wishes to make a left turn and therefore rotates the control member 24 counterclockwise about its pivot B, e.g. through the intermediary of a steering column (not shown) in line with that pivot so that camming surface 42 acts upon the follower roller 44 to deflect the guide element 18 into an inclined position as illustrated in FIG. 2. Since this does not change the position of roller 20 and lever 19, pump 13 has the same output as before so that shafts 15 and 32 continue to be driven at their previous speed. The swing of guide elements 18, however, rotates the lever 16 counterclockwise about its fulcrum 38 so as to retract the associated link 6 to throttle the fluid flow to motor 11 whereby shafts 12 and 31 are decelerated as roller 17 moves toward the lower end of track 40, with reduction of the distance $x$. If the swing of control member 24 is wide enough, endless track 33 will come to a halt and may even reverse its rotation; in an extreme case, this reverse rotation may be at the same speed as the forward rotation of track 34 so that the vehicle turns on the spot about its own vertical axis.

If the counterclockwise swing of control member 24 coincides with an upward shift of slider 4, as shown in FIG. 3, the roller 17 will ride toward the upper end of track 40 with increase in the distance $x$ so that lever 16 turns clockwise to advance the link 6. With the position of lever 19 remaining again unaffected, the backward rotation of endless track 33 is slowed down and eventually halted or even reversed.

An analogous situation exists, of course, when the operator rotates the control member 24 clockwise from its centered position illustrated in FIG. 1, with displacement of cam-follower roller 45 and inclination of guide element 21 in lieu of guide element 18.

The slight longitudinal offset of $y$, with reference to the plane of fulcrums 38 and 39, of the points of articulation of levers 16 and 19 to links 6 and 7 in the neutral position of FIG. 1 is designed to linearize as far as possible, for both positive and negative values, the delivery rates of pumps 10 and 13 as a function of the shift of slider 4 in any inclined position of guide 18 or 21. It can be shown that, with suitable selection of the parameters $x$ and $y$, this function is symmetrical about zero so that a given displacement of slider 4 in opposite directions from its neutral midposition results in the same forward and backward driving speeds. With proper setting, the speed ratio of output shafts 12 and 15 will be determined almost exclusively by the angle of inclination of track 40 or 41, substantially independently of the position of slider 4, so that an established radius of curvature will remain practically constant with different vehicle speeds. This enables the preselection of a desired radius of curvature in the standstill position of FIG. 1 in which a rotation of control member 24 by the driver-operator steering wheel has no immediate effect upon the pumps 10 and 13 but will cause them to deliver fluid at different rates, according to the chosen radius, as soon as the slider is shifted into forward or reverse.

We claim:

1. A system for maneuvering an automotive vehicle equipped with two traction elements on opposite sides thereof, comprising:

a pair of reversible fluidic transmissions drivingly coupled with said traction elements, respectively;

a source of power coupled with both said fluidic transmission for driving same at substantially identical input speeds;

first and second adjustment means for separately varying the ratios of output speeds to input speeds of each of said fluidic transmissions in a range extending from a positive maximum through zero to a negative maximum;

a slider displaceable between two limiting positions on opposite sides of a neutral position;

first and second levers symmetrically fulcrumed on said slider at locations flanking a centerline parallel to the direction of displacement, said levers being respectively linked with said first and second adjustment means;

first and second guide elements forming a pair of elongate tracks, said guide elements being rotatable about fixed parallel axes symmetrically flanking said centerline and lying in a median plane perpendicular thereto;

biasing means urging each of said guide elements into a normal position in which the track thereof parallels said centerline, said first and second levers being provided with free ends engaging the tracks of said first and second guide elements, respectively, at intermediate points in said normal position thereof with said slider in said central position; and a common control member for selectively rotating either of said guide elements from said normal position into an off-normal position in which the track thereof includes an acute angle with said centerline whereby the point of engagement of the associated lever is moved toward either end of the track upon a shifting of said slider in a respective direction from said neutral position to establish a speed ratio of corresponding sign in the associated fluidic transmission.

2. A system as defined in claim 1 wherein said fluidic transmissions have zero speed ratio in a midposition of said slider in which said free ends lie in said median plane.

3. A system as defined in claim 2 wherein said control member is swingable about a pivot in said median plane and has two symmetrical camming surfaces, said guide elements having extensions respectively bearing upon said camming surfaces in a centered position of said control member in which each guide element is in said normal position thereof, each of said extensions being displaceable by the respective camming surface only upon a swing of said control member in a corresponding direction from said centered position.

4. A system as defined in claim 3 wherein said extensions are provided with rollers engaging said camming surfaces.

5. A system as defined in claim 1 wherein said tracks are slots and said free ends are provided with rollers engaging in said slots.

6. A system as defined in claim 1 wherein said biasing means comprises a pair of coaxial pistons with axially separated heads and spring means bearing upon said heads for urging same against respective abutments, each of said guide elements being linked with one of said pistons.

7. A system as defined in claim 1 wherein each of said fluidic transmissions comprises a hydraulic pump and a hydrostatic motor fed by said pump.

8. A system as defined in claim 7 wherein said first and second adjustment means are arms pivotally mounted on said pumps for varying the delivery rates thereof, said arms and said levers forming part of two articulated linkages.

* * * * *